Patented Nov. 14, 1950

2,529,498

UNITED STATES PATENT OFFICE 2,529,498

PROCESS FOR THE MANUFACTURE OF PENTAENES

Otto Isler, Basel, Switzerland, assignor to Hoffmann-La Roche Inc., Nutley, N. J., a corporation of New Jersey No Drawing. Application April 5, 1947, Serial No. 739,647. In Switzerland April 12, 1946

5 Claims. (Cl. 260—488)

This invention relates to the manufacture of pentaenes, more particularly to the manufacture of pentaenes having a cyclohexene radical in association with a tetraene side chain, and derivatives thereof.

Several methods relating to the preparation of pentaenes and their derivatives have been published. Thus the molecular skeleton of 9 - (2',6',6' - trimethyl - cyclohexene - (1') - yl) - 3,7 - dimethyl - nonatetraene - (2,4,6,8) - ol - (1), known as vitamin-A, is built up by condensing 5 - (2',6',6' - trimethyl - cyclohexene - (1') - yl) - 3 - methyl-pentadiene - (2,4) - al - (1) with 3 - methyl-butene - (2) - al - (1) (see Berichte der Deutschen Chemischen Gesellschaft, vol. 70, year 1936, p. 853). In United States Patent No. 2,369,158 the same skeleton of 20 carbons atoms is built up by reacting the same aldehyde, or the chloride of the corresponding acid, with malonic acid and methylvinylketone to give a molecule having a skeleton of 22 carbon atoms, and subsequent splitting off of the carboxylic radicals. In United States Patents Nos. 2,369,-156-7, 2,369,160-8, 2,382,085-6, the skeleton is built up by the combination of residues containing respectively 16 and 4 carbon atoms. In these syntheses 6 - (2',6',6' - trimethyl - cyclohexene - (1') - yl) - 4 - methyl - hexadiene - (3,5) - yne - (1) and 6 - (2',6',6' - trimethyl - cyclohexene - (1') - yl) - 3 - hydroxy - 4 - methyl - hexene - (4) - yne - (1) are condensed with methylvinylketone or esters and ethers respectively of 1-hydroxy-butanone-(3). Again a synthesis involving uniting skeletal residues containing 14 and 6 carbon atoms respectively is disclosed in Experientia, vol. 2, year 1946, p. 31 and United States Patent No. 2,369,157. In these latter publications, 4 - (2',6',6' - trimethyl - cyclohexene - (1') - yl) - 2 - methyl - butene - (2) - al - (1) is reacted with 1 - methoxy - 3 - methyl - pentene - (2) - yne - (4) or with ethers of 1,3 - dihydroxy - 3 - methyl - pentyne - (4). Finally syntheses of vitamin A-ether using as starting materials 5 - (2',6',6' - trimethyl - cyclohexene - (1') - yl) - 3 - hydroxy - 3 - methyl - pentene - (4) - yne - (1) and 1 - methoxy - 3 - methyl - 4 - chloro - butene - (2) (Journal of the American Chemical Society, vol. 67, year 1945, p. 1627) as well as 4 - (2',6',6' - trimethyl - cyclohexene - (1') - yl) - butene - (3) - one (2), i. e. β -ionone, and 1 - methoxy - 3 - methyl - 6 - bromo - hexadiene - (2,4) (Chemistry and Industry, vol. 58, year 1939, p. 802) have become known. These latter two syntheses, however, are not supported by any results or by biological examination of the final product and the ultraviolet absorption at 325-328 mμ which is characteristic for vitamin A and derivatives thereof (see Journal of the American Chemical Society, vol. 67, year 1945, p. 1627).

It has now been found according to the present invention that vitamin-A-active compounds can be obtained by a process which comprises condensing, by means of Grignard reaction, β-ionone with 1-hydroxy-3-methyl-hexene-(2)-yne-(5), or an ether or ester thereof respectively, adding one mole of hydrogen to the triple bond of the condensation product obtained, subjecting the tetraene thus formed to an allyl rearrangement and splitting off water or acid respectively to obtain a vitamin-A-active compound.

The reaction may be deemed to proceed according to the following reaction scheme:

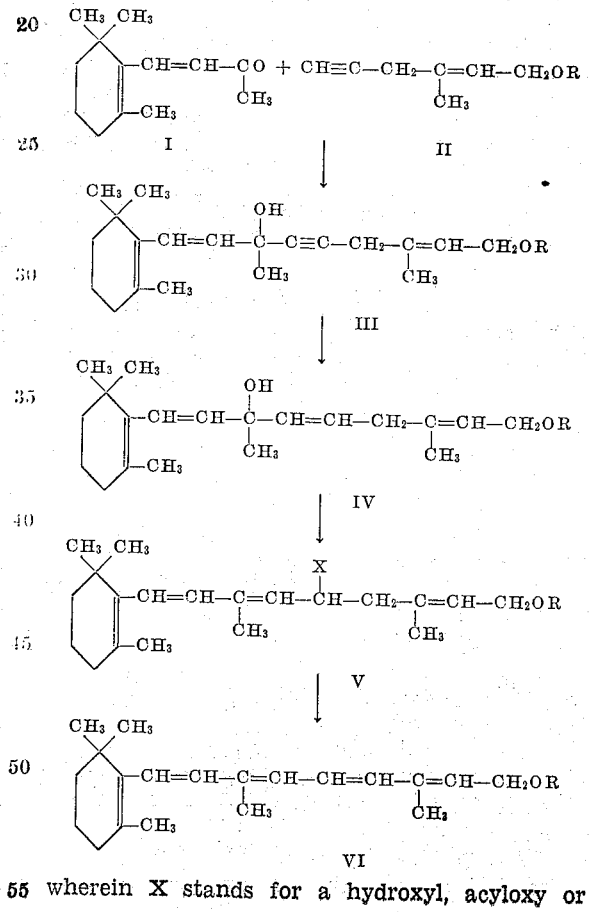

wherein X stands for a hydroxyl, acyloxy or halogen radical, and R stands for hydrogen or acyl or a hydrocarbon radical.

Thus, according to the present invention vitamin A or an ether or ester thereof may be obtained by uniting β-ionone (I), containing 13 carbon atoms, with an acetylenic side chain (II), containing 7 carbon atoms, to form a condensation product (III), containing 20 carbon atoms and one triple- and three double-bonds, only two of which double bonds stand in conjugation, partial hydrogenation of the triple bond contained in the said condensation product and submitting the resulting hydrogenation product (IV) to an allyl rearrangement and subsequent splitting off of water or acid. Thus, in this process it is avoided to construct a compound with the highly sensitive system of 5 conjugated double bonds before the very last step of the synthesis.

The 1-hydroxy-3-methyl-hexene-(2)-yne-(5) and the ethers and esters thereof, used as starting materials for the present process, were not previously known. They may, for instance, be prepared, as described in U. S. application, Serial No. 755,473, filed June 18, 1947, from propargyl-bromide and methylvinylketone in the following manner:

1 mole of propargyl-bromide and 2–4 moles of dry methylvinylketone are condensed in benzene solution under conditions usual for carrying out a Reformatsky-reaction, while boiling with 1–3 moles of zinc shavings. The zinc salt formed is decomposed with an acid and the solvent is evaporated. 3-hydroxy-3-methyl-hexene-(1)-yne-(5) of boiling point 44–47° C. (under 12 mm. Hg.) can be distilled from the viscous residue in good yield. The following constants may be used for characterisation:

$$n_D^{20°}=1.460 \qquad d_4^{18°}=0.916$$

1 - methoxy - 3 - methyl - hexene - (2) - yne - (5) is obtained from 3-hydroxy-3-methyl-hexene-(1)-yne-(5) by halogenation, for instance with phosphorus halides, during which reaction the halogen atom enters into the molecule in position 1, allyl rearrangement taking place, simultaneously. The 1-halogeno-3-methyl-hexene-(2)-yne-(5) formed is reacted with one equivalent of sodium methylate in methyl alcohol. 1-methoxy-3-methyl-hexene-(2)-yne-(5) boils at 47–49° C. (at 15 mm. Hg.).

$$n_D^{20°}=1.455 \qquad d_4^{18°}=0.913$$

The benzyl ether may be prepared in an analogous manner. The phenyl-ether is formed in good yield by boiling of 1-bromo-3-methyl-hexene-(2)-yne-(5) with phenol in acetone in the presence of potassium carbonate.

1-acetoxy-3-methyl-hexene-(2)-yne-(5) is obtained by boiling 3-hydroxy-3-methyl-hexene-(1)-yne-(5) with acetic anhydride. After driving off excess acetic anhydride the residue is fractionated in vacuum. 1-acetoxy-3-methyl-hexene-(2)-yne-(5) boils at 56–57° C. (under 12 mm. Hg.):

$$n_D^{20°}=1.450 \qquad d_4^{16°}=0.968$$

1-hydroxy-3-methyl-hexene-(2)-yne-(5) is obtained by carefully hydrolising 1-acetoxy-3-methyl-hexene-(2)-yne-(5), for instance reacting with 3 equivalents of Grignard reagent (ethylmagnesiumbromide) with subsequent mild hydrolising. It boils at 68–70° C. (under 15 mm. Hg.).

$$n_D^{18°}=1.448 \qquad n_D^{17°}=0.874$$

The first step of the present process is a Grignard reaction by which 1-hydroxy-3-methyl-hexene-(2)-yne-(5) or an ether or an ester thereof respectively is reacted with an alkylmagnesium halide (for instance ethylmagnesiumbromide). If 1-hydroxy-3-methyl-hexene-(2)-yne-(5) is used, 2 equivalents, if an ether or an ester thereof is used, 1 or 3 equivalents, respectively of the Grignard reagent are required. A mono-magnesiumhalogen compound is formed by the ethers while the di-magnesiumhalogen compound, also substituted at the hydroxy radical, is obtained from 1-hydroxy-3-methyl-hexene-(2)-yne-(5). From the esters the same di-magnesium-halogen compound is formed as from the free alcohol, the ester radicals being saponified. Either of these magnesium-halide compounds is condensed with β-ionone in the usual manner. This reaction may be carried out in the usual solvents, for instance, ethyl ether. The reaction product is now hydrolised under careful conditions, for instance with an ammonium salt solution in the cold. The reaction conditions must be chosen in such a manner as to avoid undesired splitting off of water. The crude condensation product can directly be used for the further work. Small quantities of unchanged 1-hydroxy-3-methyl-hexene-(2)-yne-(5) or the ether thereof respectively may be removed by evaporation in vacuum and unreacted β-ionone may be separated in form of a crystallized derivative (for instance as semicarbazone). Purification of the 1,7-dihydroxy - 3,7 - dimethyl - 9 - (2',6',6' - trimethyl-cyclohexene-(1')-yl)-nonadiene-(2,8)-yne-(5) or the ether thereof respectively may also be effected by a percolation chromatogram, for instance, through a column of de-activated aluminium oxide, or by partition between different solvents such as low boiling petroleum ether and aqueous methyl alcohol.

When heated, water is easily split off from the purified condensation products. They show little or no absorption of ultra violet light of higher wave length than 260 mμ. By a determination according to the Zerewitinoff method the condensation product from 1-hydroxy-3-methyl-hexene-(2)-yne-(5), or the esters thereof, and β-ionone may be shown to possess two active hydrogen atoms while the condensation products from ethers of 1-hydroxy-3-methyl-hexene-(2)-yne-(5) with β-ionone may similarly be shown to possess one active hydrogen atom.

In subjecting the condensation product (III) to partial hydrogenation of the triple-bond precautions must be taken to avoid undesired splitting off of water. Catalytic hydrogenation has been found especially suitable to effect selective absorption of 1 mole hydrogen. Palladium-calciumcarbonate, palladium-barium-sulphate or palladium-charcoal on to which quinoline has been absorbed before use, have been found able to act as catalysts. If a crude condensation product from which only unchanged 1-hydroxy-3-methyl-hexene-(2)-yne-(5) or the ether thereof respectively have been separated, is subjected to the partial hydrogenation, a lower quantity of hydrogen, corresponding to the content of β-ionone in the crude substance, is caused to react. After the calculated hydrogen quantity has been taken up, the hydrogen feed is interrupted. The hydrogenating product may be purified in the same manner as the condensation product (III) of the first reaction step. Partition between different solvents, such as for example low-boiling petroleum ether and aqueous methyl alcohol, is advantageous. The purified compound, 1,7 - dihydroxy - 3,7 - dimethyl - 9-(2',6',6'-trimethyl-cyclohexene-(1') - yl) - nonatriene-(2,5,8), or the ether thereof respectively shows no or practically no absorption over 260 mµ in an ultra-violet absorption spectrum. If so desired, the free, i. e. unetherified, compound may be esterified at the terminal hydroxy group by acting thereon, under mild conditions, with 1 mole of an acylating agent.

The condensation product obtained by partial hydrogenation is now dehydrated, rearrangement taking place simultaneously; this is effected by treatment with an agent capable of causing a so-called allyl rearrangement (Hückel, Theoretische Grundlagen der organischen Chemie, Leipzig, 4th edition, vol. I, year 1943, pages 297–8 et seq.) with subsequent splitting off of water or acid respectively. The allyl rearrangement consists of migration of the hydroxy group in position 7 to position 5 and migration of double-bond in position 5 to position 6. In this reaction step 1,7-dihydroxy - 3,7 - dimethyl - 9-(2',6',6' - trimethyl - cyclohexene - (1') - yl)-nonatriene-(2,5,8) or the ether thereof respectively is rearranged in a known manner by acylation or by heating. A method is elected avoiding such as splitting off of water prior to rearrangement, polymerisation, cyclisation etc. Thus, the hydrogenation product (IV) may be esterified by the action of organic acylating agents such as anhydrides of lower fatty acids in the presence of a basic substance. By heating, the allyl rearrangement may also be carried out without any substitution. In this reaction the presence of an agent apt to split off water may be disadvantageous since such agent may strengthen the undesired tendency to split off water prior to the rearrangement. (Thus, for instance, a compound isomeric with vitamin A methyl ether is formed from 1-methoxy-3,7-dimethyl - 7 - hydroxy-9-(2',6',6'-trimethyl - cyclohexene - (1') - yl)-nonatriene-(2,5,8) by the action, at room temperature, of p-toluene sulphonic acid in glacial acetic acid, said isomeric compound showing lower intensity of absorption in the ultraviolet spectrum and having its maximum of absorption at 310 to 315 mµ. The same compound is formed besides small quantities of vitamin A methyl ether when boiling with toluene in the presence of small quantities of iodine.) Strong acids and acid agents too may cause premature splitting off of water. The same danger exists when using halogenating agents (for instance phosphorus halides), the desired reaction thereby only occurring with low yields according to the specific method employed. The intermediates obtained by allyl rearrangement correspond to Formula V. It is unnecessary to isolate them.

A further double-bond may be introduced into the molecule by splitting off water or acid respectively. The free or esterified hydroxyl group which has migrated into position 5 is caused to split off water or acid respectively with the hydrogen atom attached to the adjacent carbon atom in position 4. According to the conditions under which the rearrangement step is carried out, the splitting off of water or acid respectively will occur in the same reaction step as the rearrangement (for instance, when heating with acetic acid anhydride in the presence of a basic means such as quinoline), or the splitting off will constitute a distinct reaction step. The splitting off of acid out of the rearranged ester V, for instance may be effected by heating with quinoline at 180° C. or by boiling with potassium amylate in tertiary amyl alcohol.

The said rearrangement with subsequent splitting off of water or acid respectively leads to pentaenes corresponding to Formula VI. The terminal functional group will be either a free or an esterified or etherified hydroxy group. If desired, the esters obtained may be hydrolised to free vitamin A.

According to one embodiment of the present invention the preparation of pentaenes may be effected in the following manner:

β-Ionone is condensed with 1-methoxy-3-methyl-hexene-(2)-yne-(5) by means of 1 mole of ethylmagnesiumbromide. After hydrolising with a solution of ammonium salt, 1 mole of hydrogen is added onto the triple-bond of the condensation product obtained while using a palladium-barium-sulphate-catalyst. The 1-methoxy-3,7-dimethyl-7-hydroxy - 9 - (2',6',6' - trimethyl-cyclohexene-(1')-yl)-nonatriene - (2,5,8) formed is boiled with acetic anhydride in the presence of potassium acetate and then heated with tertiary potassium amylate in amyl alcohol. A modification of this process consists in gradually heating to 160–180° C. 1-methoxy-3,7-dimethyl-7-hydroxy -9- (2',6',6' - trimethyl - cyclohexene - (1')-yl)-nonatriene-(2,5,8), obtained by partial hydrogenation with acetic anhydride and quinoline.

By carrying out the present invention in this manner vitamin A, vitamin-A-ester or vitamin-A-ether respectively are obtained, the physical, chemical and biological properties of such compounds corresponding to vitamin A and the esters thereof as obtained from natural sources. All these compounds are specifically characterised by showing in the ultraviolet spectrum a maximum of absorption to 325–330 mµ as typical for pentaenes.

The products of the present process may be purified by the same methods known for the purification of high concentrates of vitamin A and the esters thereof obtained from natural sources (e. g. partition between different solvents, fractional precipitation from alcoholic solution, careful distillation, chromatographic adsorption and crystallisation of the free alcohol or suitable derivatives thereof). Chromatographic adsorption is especially recommended for separating off by-products formed by undesired splitting out of water prior to the allyl rearrangement.

As required for vitamin A preparations from natural sources, the products of the present process must be protected against the destructive influence of light, air and heat. It is advisable to add antioxidants, which also may be present during the various steps of the synthesis; tocopherols have proved to be suitable for this purpose.

The following examples illustrate the manner in which the present process may be carried out:

*Example 1*

5.2 parts by weight of 1-methoxy-3-methyl-hexene-(2)-yne-(5) in 10 parts by volume of ether are added in the course of 1 hour to a solution of ethyl magnesium bromide, while working in an atmosphere of nitrogen and stirring; the latter solution having been prepared from one part by weight of magnesium shavings and 4.5 parts by weight of ethyl bromide in 20 parts by volume of ether. The mixture is refluxed for 4 hours, the magnesium compound formed being precipitated in the form of a resinous mass. The mixture is left to cool, then a solution of 7 parts by weight of β-ionone in 10 parts by volume of ether is added at −20° C. during 1 hour and the condensation completed by stirring for 4 hours at room temperature. The clear solution is decomposed by pouring onto 50 parts by weight of ice and 10 parts by weight of ammonium nitrate. The ethereal solution is then washed with a solution of ammonium salt and with water and dried with sodium sulphate. The solvent is then driven off in vacuo, while carefully avoiding overheating in order to prevent any undesired splitting off of water.

In order to obtain a pure product, unchanged β-ionone is precipitated from the crude condensation product in the form of its semicarbazone by the aid of a solution composed of 2 parts by weight of semicarbazide in 20 parts by volume of methyl-alcohol. Double its quantity of water is added to the filtrate which is then shaken out with petroleum ether. During washing of the petroleum ether with water a further quantity of β-ionone semicarbazone precipitates and is filtered off. The filtrate is dried and adsorbed onto 20 times its own weight of weakly activated aluminium oxide. The desired condensation product adheres to the adsorbent whereas unchanged 1 - methoxy - 3 - methyl - hexenyne and products resulting from splitting off of water may be washed out with petroleum ether. The purified 1-methoxy - 3,7 - dimethyl - 7 - hydroxy - 9 - (2',6',6'-trimethyl-cyclohexene-(1') - yl) - nona - diene-(2,8)-yne-(5) is eluted with ether. After evaporation of the solvent 5–7 parts by weight of the pure condensation product are obtained as a viscous, yellow oil.

The constitution of the compound is proved by a determination according to Zerewitinoff, this method leading to values for 1 active hydrogen atom, and by measuring the adsorption in ultra-violet spectrum whereby it is found that there is only adsorption below 270 m$\mu$, thus allowing for 1 conjugation only.

10 parts by weight of 1-methoxy-3,7-dimethyl-7-hydroxy-9 - (2',6',6' - trimethyl - cyclohexene-(1')-yl)-nonadiene-(2,8)-yne-(5) are dissolved by 100 parts by volume of methyl alcohol and hydrogenated at room temperature while using 1.5 parts by weight of 1% palladium-bariumsulphate-catalyst and preferably adding 0.05 part by weight of tocopherol as an antioxidant. The hydrogenation is interrupted after 1 mole of hydrogen (corresponding to 770 parts by weight— under 740 mm. Hg and at 20° C.) have been taken up. The catalyst is filtered off and, in order to separate some compounds formed by undesired splitting off of water, 4 parts of water are added to the filtrate which is then shaken out with small quantity of petroleum ether of boiling point 30–60° C. The methyl alcoholic solution is then diluted with 200 parts of water, shaken out with ether and the ethereal extracts are dried and concentrated. About 9 parts by weight of 1-methoxy-3,7 - dimethyl-7-hydroxy-9-(2',6',6'-trimethyl-cyclohexene - (1') -yl) - nonatriene-(2,5,8) are obtained as a yellowish, viscous oil of $n_D^{20}=1.513$. The determination according to Zerewitinoff shows 1 active hydrogen atom to be present in the molecule. In the ultraviolet spectrum no or only weak absorption above 260 m$\mu$ is obtained.

4 parts by weight of the product obtained by partial hydrogenation are dissolved in 20 parts by volume of acetic anhydride, 4 parts by weight of dry potassium acetate are added and the mixture is refluxed for 2 hours while excluding light. Excess acetic anhydride and glacial acetic acid formed are evaporated in vacuum. The residue is taken up in petroleum ether of boiling point 30–60° C. and water. The solution in petroleum ether is washed with sodium bicarbonate and water, dried with sodiumsulphate and evaporated to dryness. The brown oil obtained is fractionated by molecular distillation. After some unimportant first runnings, 3 parts by weight of a yellowish oil of boiling point 80–90° C. (under a pressure of $10^{-5}$ mm. Hg) are obtained which show very clear absorption within the range corresponding to pentaenes (315–335m$\mu$) and possess high activity when subjecting to the growth test with rats deficient in vitamin A.

The quantity of the final product showing the specific absorption in ultraviolet light may be increased by boiling with tertiary potassium amylate in amylene hydrate.

*Example 2*

10 parts by weight of the crude condensation product of the Grignard reaction (prepared according to Example 1) are hydrogenated while carefully controlling the hydrogen uptake; 1 part by weight of 4% palladium-bariumsulphate, deactivated by previous heating to 600° C., is used as catalyst. After absorption of a little less than 1 mole of hydrogen, the catalyst is filtered off, unreacted β-ionone is precipitated as semicarbazone, the hydrogenated compound is worked up according to Example 1 and reacted with acetic anhydride in the presence of a basic substance. The same compound as in Example 1 is obtained in good yield.

*Example 3*

3 parts by weight of 1-methoxy-3,7-dimethyl-7-hydroxy-9 - (2',6',6' - trimethyl - cyclohexene-(1')-yl)-nonatriene-(2,5,8) (prepared according to Example 1) are dissolved in 30 parts by weight of quinoline and 6 parts by weight of acetic anhydride. The solution is heated for 2 hours to 80–100° C. and then for 1 hour to 160–180° C. After cooling down, the mixture is shaken out with low boiling petroleum ether and then washed repeatedly with 95% methyl alcohol and with water. The petroleum ether is evaporated and the residue is fractionated by molecular distillation. About 2 parts by weight of a yellow, viscous oil of boiling point 80–90° C. (under a pressure of $10^{-5}$ mm. Hg), are obtained, showing a well-marked absorption in ultraviolet light within the range corresponding to pentaenes. Additionally, the product shows a maximum of absorption at 310–315 m$\mu$, i. e. the range corresponding to tetraenes, said absorption probably being caused by the presence of an isomeric substance formed by undesired splitting off of water prior to esterification. This compound may be separated off by a percolation chromatogram with petroleum ether onto aluminium oxide of low activity.

*Example 4*

2 parts by weight of 1-methoxy-3,7-dimethyl-7-hydroxy-9-(2',6',6'-trimethyl - cyclohexene-(1') - yl)-nonatriene-(2,5,8), prepared in accordance with Example 1, are left to stand at room temperature for 70 hours with 4 parts by volume of acetic anhydride and 8 parts by volume of pyridine. The reaction solution is then poured on ice and shaken out with petroleum ether of boiling point 30–60° C. The extracts are successively washed with 1 normal sulphuric acid, a solution of sodium bicarbonate and water, dried with sodium sulphate and boiled down. The residue, 1.5 parts by weight, upon addition of antimony trichloride in chloroform solution, shows an intensive blue colour (main absorption maximum at 620 m$\mu$, auxiliary absorption maximum at 580 m$\mu$).

2 parts by weight of this reaction product are dissolved in 4 parts by volume of tertiary amyl alcohol and then added, in the course of 15 minutes while stirring and introducing nitrogen, to a boiling solution of 1 part by weight of potassium in 20 parts by volume of tertiary amyl alcohol. After lapse of one hour, the reaction solution is cooled, diluted with petroleum ether of boiling point 30–60° C. and successively washed with 95% methyl alcohol and water. The solution is then dried and boiled down. The residue, a yellow-brown oil, according to the determination of the intensity of absorption in ultraviolet light and to the Carr-Price determination, contains about 10% vitamin A methyl ether.

In order to purify the crude product, it is chromatographed with petroleum ether onto a column of weakly activated aluminium oxide. By the aid of alcohol as an eluting agent, a vitamin A methyl ether preparation is obtained from the main zone (showing greenish fluorescence in the light of a quartz lamp) of the chromatogram; under a pressure of $10^{-4}$ mm. Hg the said preparation distills at 80–90° C. It is of high biological activity.

*Example 5*

3.2 parts by weight of 1-methoxy-3,7-dimethyl-7-hydroxy-9-(2',6',6'-trimethyl-cyclohexene-(1')-yl)-nonatriene-(2,5,8) are dissolved in 20 parts by volume of pyridine and 10 parts by volume of chloroform. In the course of one hour a solution of 1.5 parts by weight of benzoyl chloride in 10 parts by volume of chloroform is added while stirring and cooling with ice. The temperature of the yellow solution is allowed to rise to room temperature in the course of 12 hours; then the solution is diluted with petroleum ether of boiling point 30–60° C., cooled with ice, successively washed with sodium-bicarbonate solution, dilute sulphuric acid and water, dried and boiled down. The yellow-brown residue is treated with tertiary potassium amylate in tertiary amyl alcohol, according to the indications in Example 4. A crude product containing 5–10% vitamin A methyl ether is obtained and may be purified in accordance with Example 4.

In this example the equivalent quantity of acetyl chloride may be used instead of benzoyl chloride; vitamin A methyl ether is thus obtained in equal yield.

I claim:
1. Process which comprises condensing $\beta$-ionone with a Grignard of a member of the group consisting of 1-hydroxy-3-methyl-hexene-(2)-yne-(5) and 1-lower alkoxy-3-methyl-hexene-(2)-yne-(5) to produce the corresponding 1,7-dihydroxy-3,7-dimethyl-9-(2',6',6'-trimethyl-cyclohexene-(1')-yl-)-nonadiene-(2,8)-yne-(5) or the 1-lower alkyl ether thereof.

2. A process according to claim 1 in which the resulting product is hydrogenated only to the extent needed to convert the yne to a corresponding ene.

3. A process according to claim 1 in which the condensed product is hydrogenated to convert the yne to the corresponding ene and subjecting the compound to esterification and allyl rearrangement to convert said compound to vitamin A compounds.

4. A process according to claim 3 in which the esterification and allyl rearrangement is effected by means of an acylating agent.

5. A process comprising reacting, by means of a Grignard reagent, $\beta$-ionone with a Grignard of a compound selected from the group consisting of 1-hydroxy-3-methyl-hexene-(2)-yne-(5) and the lower alkyl ethers thereof, adding to the triple bond of the condensation product obtained 1 mol of hydrogen by partial hydrogenation, and subjecting the compounds thus produced to esterification and allyl rearrangement by means of an acylating agent, and thereafter splitting off acid from the resultant compound.

OTTO ISLER.

REFERENCES CITED

The following references are of record in the file of this patent:

UNITED STATES PATENTS

| Number | Name | Date |
|---|---|---|
| 2,369,167 | Milas | Feb. 13, 1945 |
| 2,412,465 | Milas | Dec. 10, 1946 |
| 2,475,139 | Isler et al. | July 5, 1949 |

OTHER REFERENCES

Gridgeman Chem. and Ind., vol. 37, 555–558 (1947).

Heilbron et al., Jour. Chem. Soc., 727–732 (1942).

Thompson, Jr., et al., Jour. Am. Chem. Soc. vol. 63, 752–4 (1941).

Oroshnik Jour. Am. Chem. Soc., vol. 67, 1627–8 (1945).

Fieser et al., Organic Chemistry, Pub. by D. C. Heath & Co., Boston (1944) page 78.

Certificate of Correction

Patent No. 2,529,498                                                    November 14, 1950

OTTO ISLER

It is hereby certified that error appears in the printed specification of the above numbered patent requiring correction as follows:

Column 1, line 17, for the word "carbons" read *carbon*; line 50, for "one (2)" read *one-(2)*; column 5, line 26, after the syllable and hyphen "avoid-" insert *ing as far as possible undesired side reactions,*;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*